May 12, 1953 H. J. RIBLET 2,638,588
ELECTROMAGNETIC-RADIATING SYSTEM
Filed Oct. 20, 1950 2 Sheets-Sheet 1

INVENTOR
HENRY J. RIBLET
BY Elmer J. Gorn
ATTORNEY

Patented May 12, 1953

2,638,588

UNITED STATES PATENT OFFICE 2,638,588

ELECTROMAGNETIC-RADIATING SYSTEM

Henry J. Riblet, Wellesley Hills, Mass., assignor to Raytheon Manufacturing Company, Newton, Mass., a corporation of Delaware Application October 20, 1950, Serial No. 191,269

3 Claims. (Cl. 343—101)

This invention relates to electromagnetic-wave radiating systems, and more particularly to an antenna system which may be used in conjunction with instrument-landing systems for aircraft-landing approaches.

In the instrument-landing systems used today, directive signals are beamed along the aircraft approach path slightly diverging therefrom. An aircraft approaching to land along said path will then pick up all the signals with equal intensity indicating a correct approach. If the aircraft deviates from the correct approach path, one or more of the signal beams will be received more strongly than the others, thus indicating by audible or other means that the aircraft is off course, and that suitable course correction is required.

In prior systems, the antennas which radiated the signals were positioned in various places, for example, on the sides of the landing runway or at the ends thereof.

This invention discloses apparatus whereby one or more of the antennas may be positioned directly in the center of the runway, thereby allowing a uniform set of diverging signal patterns to be directed, from any desired point on the runway, upwards along the normal aircraft approach path.

Briefly, this is accomplished by placing the radiating system in a recess in the runway and covering the recess with a suitable lens on which the aircraft may land. The lens may be, for example, a dielectric medium which slightly bends the radiated signal to produce the desired directivity of the signal patterns. The surface of the lens is made flush with the runway, and is of sufficient strength that an aircraft may roll over it. By the use of the lens, a relatively small recess in the runway may be used to hold an antenna system which will produce the desired set of signal-radiation patterns.

Figure 1:
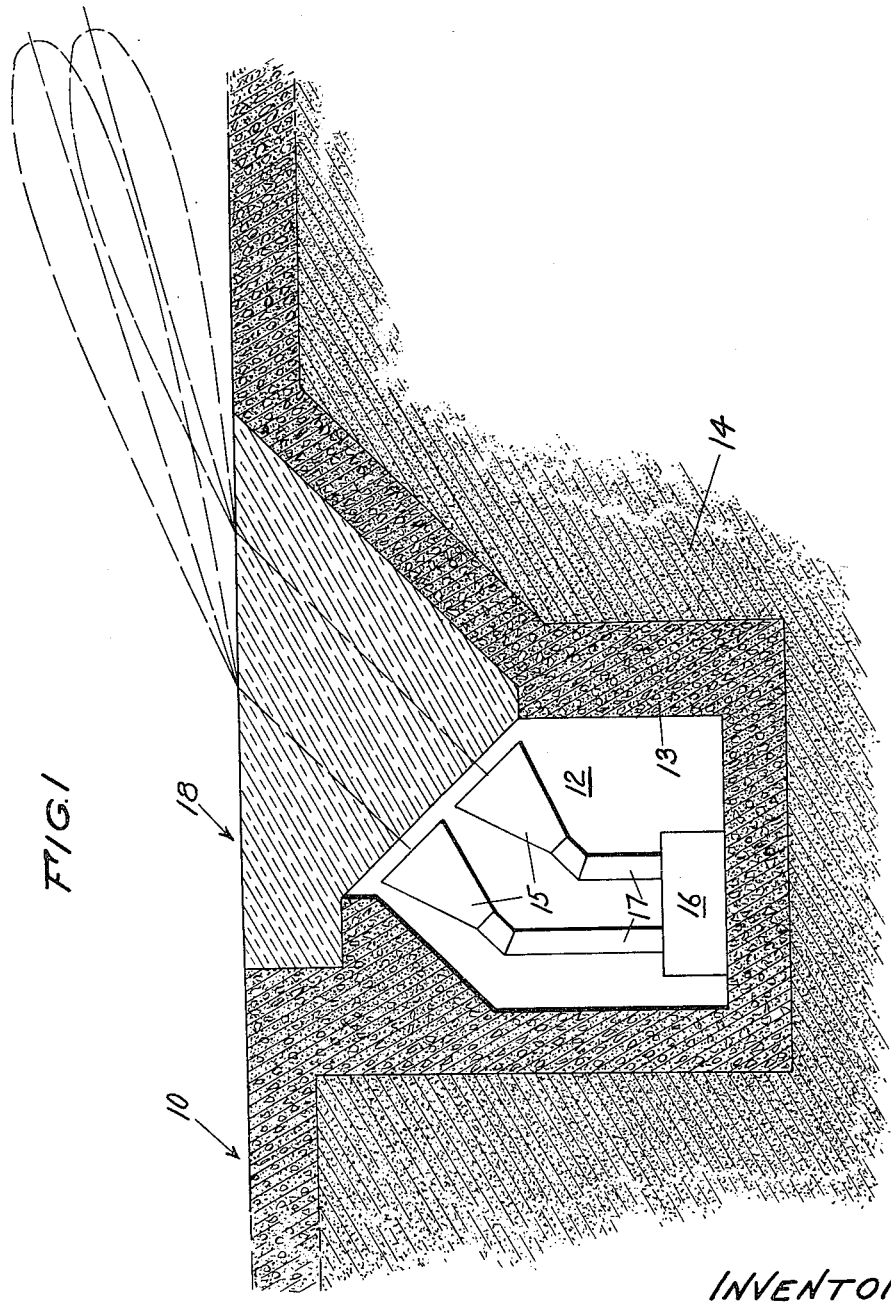
Figure 2:
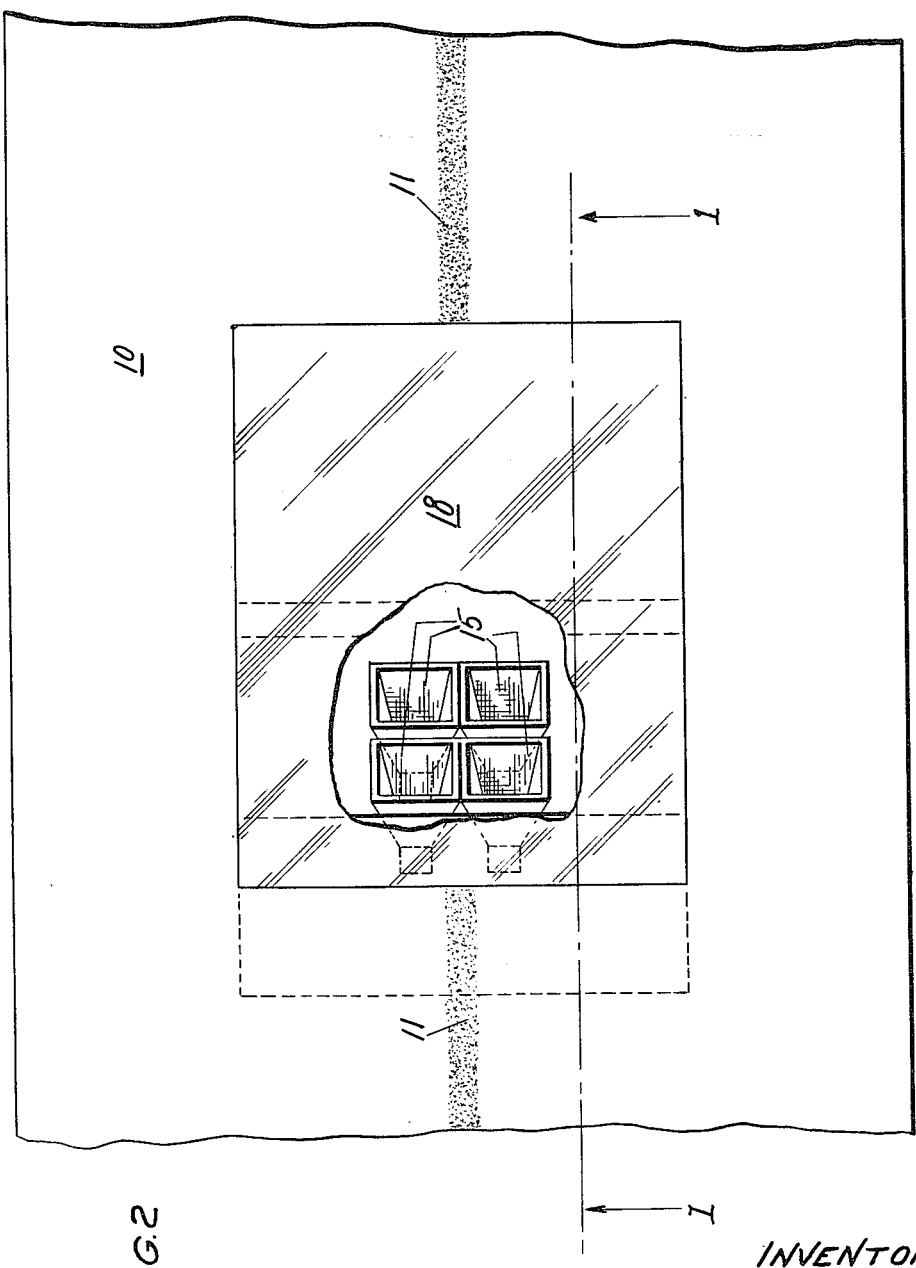

Other and further advantages of this invention will be apparent as the description thereof progresses, reference being had to the accompanying drawings, wherein:

Fig. 1 illustrates a vertical, cross-sectional view of the runway and recess holding the radiating system and the lens, taken along line 1—1 of Fig. 2; and Fig. 2 illustrates a plan view of the lens and runway shown in Fig. 1.

Referring now to Figs. 1 and 2, there is shown a runway 10 which may be, for example, of concrete having a center line 11 thereon to aid the pilot in visually centering the aircraft on the runway. Positioned in the runway is a recess 12 which as shown here, for example, is lined with concrete 13 set in the ground 14.

Positioned in the recess 12 are four directive-radiating systems 15, shown here, by way of example, as radiating horns. It is to be clearly understood that this invention contemplates the use of other directive-radiating means than the horns shown. For example, parasitic arrays, reflectors, or combinations of these systems with the horns could be used.

The radiating systems are fed from a transmitter 16 through wave guides 17. The signals fed by the transmitter to the radiating means 15 differ from each other by some detectable phenomena such as frequency, pulse, repetition rate, pulse width, or intelligence modulation. The radiating means 15 direct the radiated waves upward at any desired angle such as is shown here, by way of example, as an oblique angle. Positioned above the radiating means 15 is a lens 18 through which the radiated waves pass. Lens 18 may be of any desired material such as polystyrene, and is used for the purpose of directing the beams radiated from the radiating means 15 along the path of normal approach of an aircraft to the runway, each signal slightly diverging from the others in a different direction. Thus, it may be seen that, by the use of a radiating system placed in a recess of a runway with a lens positioned over the radiating system, a landing-system pattern may be radiated from any desired point in the runway.

This completes the description of the invention described herein. However, it is contemplated that many modifications of the invention will be apparent to persons skilled in the art without departing from the spirit and scope thereof. For example, the antenna-radiating system described herein could be used for other purposes than for signal-strength landing-approach systems. For example, it could be used for communication purposes or for radar. In addition, any type of directivity or polarization of the radiated waves may be used, and other types of lenses such as parallel plate metallic lenses or diffraction gratings could be used to direct the beam patterns. Accordingly, it is desired that this invention be not limited to the particular details of the embodiment illustrated herein, except as defined by the appended claims.

What is claimed is:

1. An electromagnetic-radiating system comprising an aircraft-landing runway having a recess therein, electromagnetic-wave radiating horn means positioned in said recess, and a low-loss dielectric electromagnetic-wave energy lens positioned over said radiating means, the surface of said lens adjacent said radiating means being substantially perpendicular to the direction of radiation of waves from said radiating means.

2. An electromagnetic-radiating system comprising an aircraft-landing runway having a recess therein, electromagnetic-wave radiating horn means positioned in said recess, and a low-loss dielectric electromagnetic-wave energy lens positioned over said radiating means, said lens cooperating with said radiating means to direct the radiated energy.

3. An electromagnetic-radiating system comprising an aircraft-landing runway having a recess therein, electromagnetic-wave radiating horn means positioned in said recess, and a substantially wedge-shaped lens positioned over said radiating means, the top of said lens being substantially flush with the surface of said runway, the surface of said lens adjacent said radiating means being substantially perpendicular to the direction of radiation of waves from said radiating means.

HENRY J. RIBLET.

References Cited in the file of this patent

UNITED STATES PATENTS

| Number | Name | Date |
|---|---|---|
| 1,906,546 | Darbord | May 2, 1933 |
| 2,064,171 | Leib | Dec. 15, 1936 |
| 2,082,042 | Wolff | June 1, 1937 |
| 2,120,241 | Diamond et al. | June 14, 1938 |
| 2,283,568 | Ohl | May 19, 1942 |
| 2,435,988 | Varian | Feb. 17, 1948 |
| 2,525,861 | Carlin | Oct. 17, 1950 |
| 2,530,580 | Lindenblad | Nov. 21, 1950 |